(12) United States Patent
Nikkeshi

(10) Patent No.: US 6,624,258 B1
(45) Date of Patent: Sep. 23, 2003

(54) AGENT FOR IMPARTING FLAME RETARDANCY TO THERMOPLASTIC RESIN

(75) Inventor: Susumu Nikkeshi, Kurokawa-gun (JP)

(73) Assignee: Tohoku Munekata Co., Ltd. (JP)

( * ) Notice: Subject to any disclaimer, the term of this patent is extended or adjusted under 35 U.S.C. 154(b) by 0 days.

(21) Appl. No.: 10/231,683

(22) Filed: Aug. 30, 2002

(30) Foreign Application Priority Data

Apr. 26, 2002 (JP) ......................................... 2002-125672

(51) Int. Cl.⁷ ........................ C08G 65/32; C08G 65/48
(52) U.S. Cl. ........................ 525/408; 528/207; 528/209; 528/219

(56) References Cited

U.S. PATENT DOCUMENTS

| | | | |
|---|---|---|---|
| 4,173,486 A | * 11/1979 | Cheetham et al. | 524/6 |
| 5,844,033 A | * 12/1998 | Nikkeshi et al. | 524/450 |
| 6,156,817 A | * 12/2000 | Okamoto et al. | 523/102 |
| 6,194,489 B1 | * 2/2001 | Nikkeshi et al. | 523/212 |
| 6,359,041 B1 | * 3/2002 | Nikkeshi et al. | 524/72 |
| 6,379,797 B1 | 4/2002 | Nikkeshi et al. | |

FOREIGN PATENT DOCUMENTS

| | | | |
|---|---|---|---|
| EP | 0818502 A1 | * | 1/1998 |
| EP | 0924252 A1 | * | 6/1999 |
| JP | 7097486 | * | 4/1995 |
| JP | 9031241 | * | 2/1997 |
| JP | 3046962 | | 3/2000 |
| JP | 3046963 | | 3/2000 |
| JP | 3046964 | | 3/2000 |
| JP | 02001040033 A | * | 2/2001 |

OTHER PUBLICATIONS

JP2001–040033 (Kusakaishi, et al.) published Feb. 13, 2001, machine translation retrieved from JPO PAJ database, http://www.ipdl.jpo.go.jp/homepg_e.ipdl [online], on Feb. 3, 2003.*

JP11–181138 (Kusakaishi, et al.) published Jul. 6, 1999, machine translation retrieved from JPO PAJ database, http://www.ipdl.jpo.go.jp/homepg_e.ipdl [online], on Jun. 10, 2002.*

* cited by examiner

*Primary Examiner*—Matthew A. Thexton
(74) *Attorney, Agent, or Firm*—Harness, Dickey & Pierce, P.L.C.

(57) ABSTRACT

An agent for imparting flame retardancy to a thermoplastic resin contains a polyhydric phenol such as a tannin compound as an effective component. The thermal stability of the thermoplastic resin can be improved so as to elevate the decomposition temperature of the thermoplastic resin if a small amount of the flame retardancy imparting agent is added to the thermoplastic resin so as to suppress the combustibility of the thermoplastic resin.

4 Claims, 1 Drawing Sheet

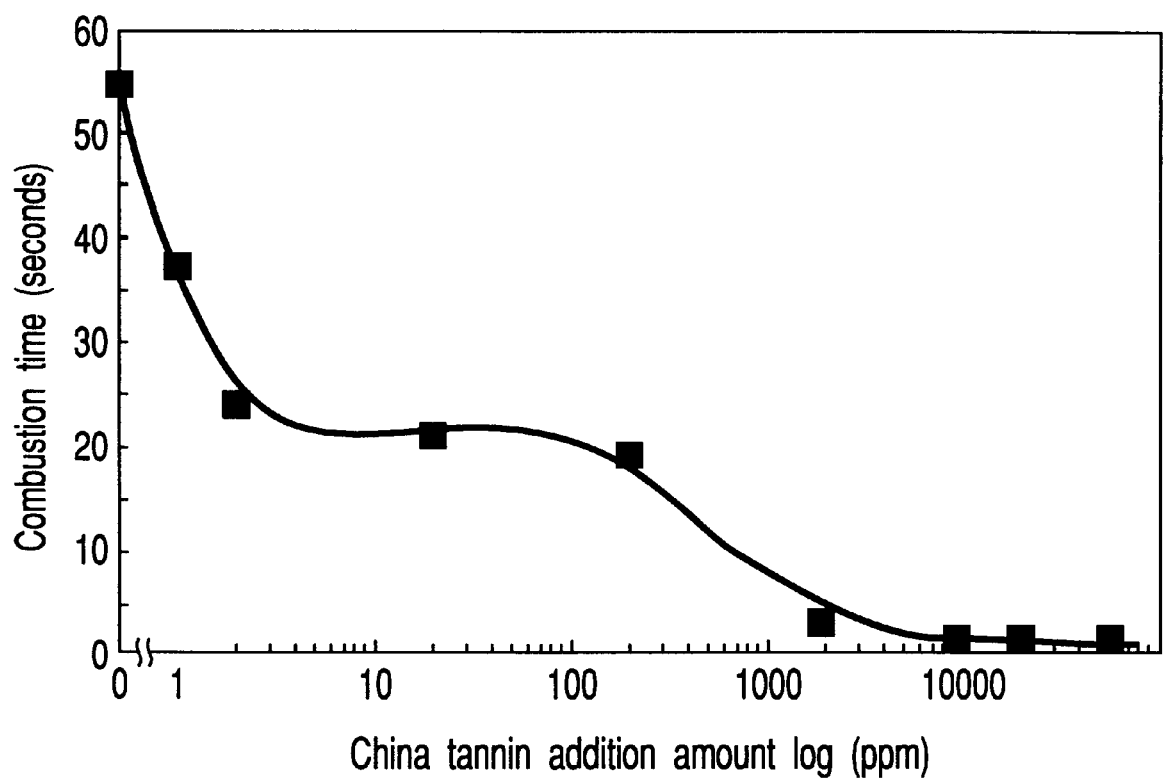
FIGURE

AGENT FOR IMPARTING FLAME RETARDANCY TO THERMOPLASTIC RESIN

CROSS-REFERENCE TO RELATED APPLICATIONS

This application is based upon and claims the benefit of priority from the prior Japanese Patent Application No. 2002-125672, filed Apr. 26, 2002, the entire contents of which are incorporated herein by reference.

BACKGROUND OF THE INVENTION

1. Field of the Invention

The present invention relates to an agent for imparting a flame retardancy to a thermoplastic resin.

2. Description of the Related Art

It is necessary for the synthetic resin used in domestic electrical appliances sold in the United States to exhibit the flame retardancy stipulated in UL-94 included in UL (Underwriters Laboratories Inc.) standards. Also, in recent years, it tends to be necessary for this standard to be satisfied in many countries in addition to the United States. Flame-retardant material satisfying the UL-94 standard tends to be used in Japan, though it is not obligatory in Japan to use the flame-retardant material satisfying this standard.

In the conventional flame-retardant, the flame retardancy is considered to be developed mainly by the three principles given below:

1) The flame retardancy is imparted to a synthetic resin by adding a halogen-based compound and a phosphoric acid-based compound to the synthetic resin. Specifically, a halogen-based compound and a phosphoric acid-based compound are added to the synthetic resin in an amount of several percent to scores of percent so as to allow these additive compounds to act as a negative catalyst relative to the combustion flame so as to stop the combustion.
2) About several percent to scores of percent of a silicone compound is added to a synthetic resin so as to allow the silicone compound to bleed on the surface of the synthetic resin under combustion. As a result, char (a carbonized layer) is formed on the surface of the synthetic resin so as to stop the combustion.
3) An inorganic salt such as magnesium hydroxide or aluminum hydroxide is added to a synthetic resin in an amount of about 30 to 40%. Since the combustion of the synthetic resin causes the added metal salt to absorb heat so as to be decomposed and to form water, the formed water cools the entire resin composition so as to stop the combustion.

However, principle 1) given above is defective in that, if a domestic electrical appliance including a synthetic resin containing a flame-retardant is discarded and combusted, the halogen compound forms dioxin and the ash formed by the combustion causes phosphoric acid, bringing about a water contamination problem. Also, in principle 2) given above, it is necessary to add a large amount of the silicone compound used as a flame-retardant to the synthetic resin. As a result, the properties inherent in the synthetic resin tend to be changed. For example, the mechanical strength of the synthetic resin tends to be lowered. Further, in principle 3) given above, it is necessary to add a large amount of the inorganic salt used as a flame-retardant to the synthetic resin, with the result that the synthetic resin tends to be hydrolyzed or the mechanical properties of the synthetic resin tend to be impaired.

BRIEF SUMMARY OF THE INVENTION

As a result of extensive research into the influences of the thermal stabilizer on the thermoplastic resin, the present inventors have found that, if the thermal stability of the thermoplastic resin is highly improved, flame retardancy can be imparted to the thermoplastic resin.

The present inventors have further continued extensive research based on the finding referred to above. It has been newly found that the thermal stability of a thermoplastic resin can be improved if a small amount of a polyhydric phenol, particularly, a tannin compound, is added to the thermoplastic resin. To be more specific, it has been newly found that the decomposition temperature of the thermoplastic resin can be elevated by the addition of the polyhydric phenol so as to suppress the combustibility of the thermoplastic resin, leading to the agent of the present invention for imparting flame retardancy to the thermoplastic resin.

According to the present invention, there is provided an agent for imparting flame retardancy to a thermoplastic resin, the agent containing a polyhydric phenol as an effective component.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

The single FIGURE is a graph showing the relationship between the addition amount of China tannin and the combustion time in Example 7 of the present invention.

DETAILED DESCRIPTION OF THE INVENTION

The present invention will now be described in detail.

The agent of the present invention for imparting flame retardancy to a thermoplastic resin contains a polyhydric phenol as an effective component.

It is desirable for the polyhydric phenol to be a tannin compound. The tannin compounds used in the present invention include, for example, tannin, tannic acids such as tannic acid, catechins, leucoanthocyanogens, and chlorogenic acids, which are widely contained in natural plants. The classification of these tannin compounds is described in, for example, "Chemistry of Natural Substances, p. 98 (1983)" compiled by Takao Murakami and Toshihiko Okamoto, and published by Hirokawa Shoten. Incidentally, tannic acid is also called tannin. Tannic acid and tannin are not particularly distinguished herein.

Each of the tannic acids and catechins can be classified into hydrolysis types and condensation types. Since each of the hydrolysis type compounds and the condensation type compounds are natural compounds, there are many compounds differing from each other in chemical structure. The hydrolysis type tannin includes China tannin, ellagic tannin, and chlorogenic acid formed of depside such as caffeic acid or quinic acid. Particularly, China tannin is constructed such that gallic acid or its derivative has an ester bond. On the other hand, the condensation type tannin includes, for example, quebracho tannin, wattle tannin, gambir tannin, ghatti tannin and flava tannin.

China tannin, which is a typical condensation type tannin, has chemical structure (1) given below. To be more specific, it has been clarified that 10 gallic acid groups are coordinated around a dextrose residue and two additional gallic acid groups are bonded perpendicularly, i.e., arranged in the *-mark position in structural formula (1). However, the compound center is not limited to dextrose. It is possible for the compound center to be a cellulose type compound. It is also possible to use didepside of gallic acid, which is obtained by hydrolysis of tannic acid and represented by structural formula (2) given below. Since tannic acid is a compound widely contained in natural plants, it is of no difficulty to infer that the compound partially differs in chemical structure.

Catechins have chemical structures represented by, for example, structural formulas (3)(a) to (3)(d) given below. Quepro tannin is represented by, for example, structural formula (4) given below, and Turkey tannin is represented by, for example, structural formula (5) given below:

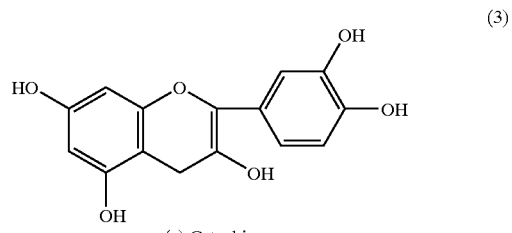
(a) Catechin

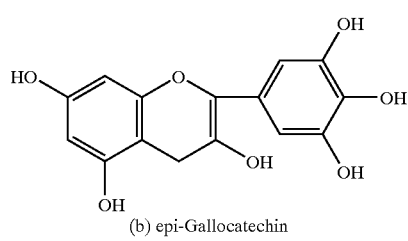
(b) epi-Gallocatechin

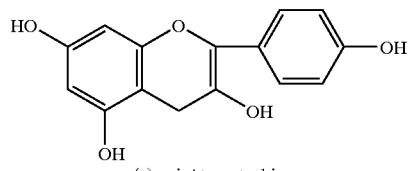
(c) epi-Atzecatechin

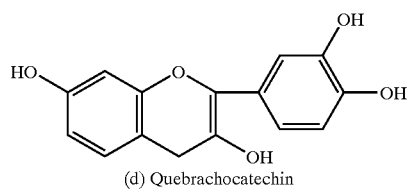
(d) Quebrachocatechin

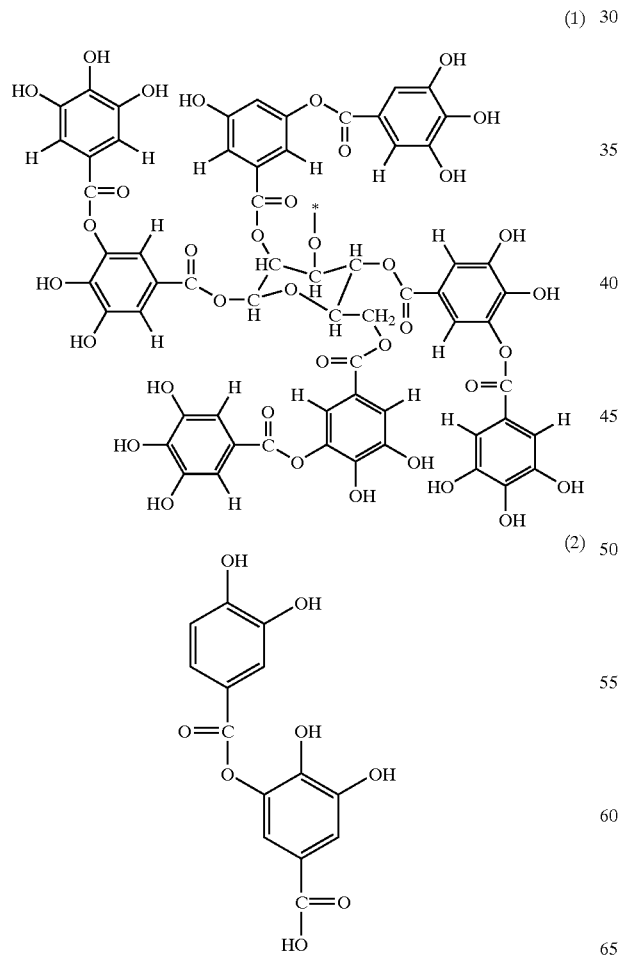

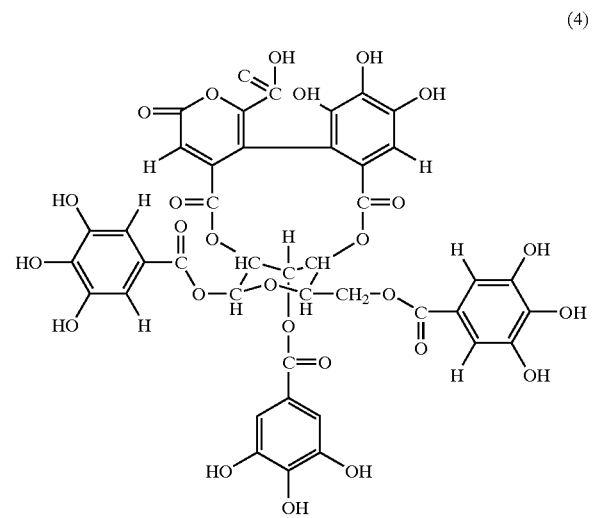

-continued

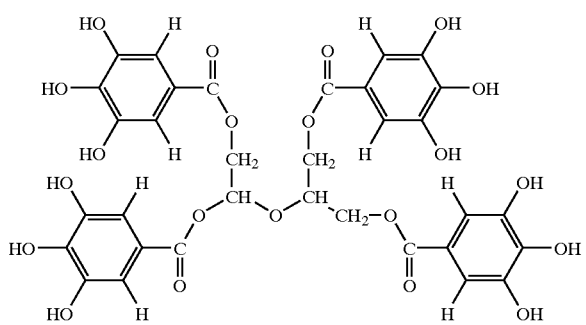

(5)

The tannin compound includes, for example, a dehydro-condensed tannin. The dehydro-condensed tannin can be prepared by heating tannin at 70 to 230° C. for several minutes to several hours. The dehydration reaction is carried out among the heated tannin molecules so as to form a dehydro-condensed tannin compound having a molecular weight about 1.6 times as high as that of tannin. The bonding between the heated tannin compounds, which is mainly intermolecular bonding of the tannin compounds, is considered to be carried out such that a water molecule is formed by two adjacent hydroxyl groups within the tannin molecules so as to achieve the dehydro-condensation in which the formed water molecule is removed from the dehydro-condensed tannin. It is desirable for the tannin compound noted above, which is obtained by the heating at 70 to 230° C. and the subsequent dehydration, to be in the form that a plurality of tannin compounds are polymerized by the dehydro-condensation. It should be noted that what is important in this case is that the tannin molecules are dehydrated to some extent. It is not absolutely necessary for the tannin molecules to be subjected to the condensation polymerization.

Incidentally, a tannin compound having a dye fixing effect or a skin tanning effect is called a synthetic tannin. The compound that is effectively used in the present invention can be used as the synthetic tannin. Presently, tannin is used in daily necessaries such as ink, in medicines such as a hemostatic agent, and in industrial chemicals such as a skin tanning agent or a mordant used in the dying process. Tannin is also used recently as a food additive.

The tannin compound noted above includes, for example, a copolymer tannin. For preparing the copolymer tannin, polyvinyl alcohol (PVA) or polyethylene glycol (PEG) is dissolved in water or a lower alcohol so as to prepare a PVA solution or a PEG solution, followed by adding tannin or a tannin solution to the PVA solution or the PEG solution. As a result, a copolymer is easily formed and precipitated. The copolymer tannin can be obtained by filtering the precipitate.

The copolymerization step noted above is scarcely affected by the concentration of the PVA solution, the PEG solution or the tannin solution. However, it is necessary to select appropriately the molecular weight of PVA or PEG used. To be more specific, if the molecular weight of PVA or PEG is excessively low, PVA or PEG is in the form of a liquid at room temperature. Alternatively, the heat resistance of the formed copolymer tannin is lowered. On the other hand, if the weight average molecular weight of PVA or PEG is higher than about 1,000,000, PVA or PEG is swollen by water in the step of preparing an aqueous solution used for the reaction so as to make it difficult to prepare a uniform solution. It follows that it is difficult to obtain a uniform copolymer tannin. Under the circumstances, it is desirable to use PVA or PEG having a weight average molecular weight falling within a range of 800 to 900,000, more desirably 1,000 to 100,000.

If the proportion of one of the reactants is small in the copolymerization step noted carried out between PVA or PEG and tannin, a graft compound is obtained in proportion to the amount of the reactant having the low proportion. Therefore, it is unnecessary to consider too strictly the proportions of the reactants in the copolymerization step. However, it is economically desirable to carry out the copolymerization by using substantially equimolar amounts of the reactants in order to avoid generation of unreacted reactants. Incidentally, it is possible to use a mixture of PVA and PEG in the copolymerization step.

In the copolymerization step noted above, it is desirable to use water or a lower alcohol as a solvent. In addition, it is also possible to use a solvent capable of dissolving any of PVA and tannin, i.e., a solvent such as acetonitrile, in the copolymerization step.

It is desirable to heat the copolymer tannin thus obtained to 70° C. to 230° C. so as to remove water in advance.

The copolymer tannin thus obtained, which is insoluble in water or a lower alcohol, is compatible with polyethylene terephthalate resin (PET), polybutylene terephthalate (PBT), polycarbonate (PC), etc., to which flame retardancy is to be imparted. Further, where the copolymerized tannin is added to PET, the transparency inherent in PET is not impaired.

The various tannin compounds noted above can be used singly as a flame retardancy imparting agent. Alternatively, a mixture of a plurality of different tannin compounds can be used as the flame retardancy imparting agent.

How to use the flame retardancy imparting agent of the present invention will now be described.

The flame retardancy imparting agent of the present invention is added to a thermoplastic resin so as to impart flame retardancy to the thermoplastic resin.

The flame retardancy imparting agent can be added to various thermoplastic resins. Particularly, it is desirable to add the flame retardancy imparting agent of the present invention to polyester resin. It is more desirable to select polyethylene terephthalate resin (PET), polybutylene terephthalate (PBT) and polycarbonate (PC) from among the various kinds of polyesters as the thermoplastic resin to which the flame retardancy imparting agent of the present invention is added. It is also desirable to add the flame retardancy imparting agent of the present invention to a thermoplastic resin blend containing at least one thermoplastic resin. For example, it is desirable to add the flame retardancy imparting agent of the present invention to a blend of PBT/PET, PBT/PC, PBT/ABS or PC/ABS.

It is possible for the thermoplastic resin to contain at least one kind of the material selected from the group consisting of inorganic fibers such as glass fibers, carbon fibers and whiskers, organic fibers such as quebracho fibers, and inorganic particles such as silica, talc, mica, wollastonite, clay and calcium carbonate.

Concerning the method of adding the flame retardancy imparting agent to a thermoplastic resin, it is possible to add the tannin compound noted above directly to the thermoplastic resin. Alternatively, it is possible to mix in advance the tannin compound with a thermoplastic resin, followed by adding the mixture to the thermoplastic resin.

It is desirable for the flame retardancy imparting agent to be added to the thermoplastic resin to permit the thermoplastic resin to contain 2 to 20,000 ppm, preferably 200 to 3,000 ppm, of the effective component of the polyhydric phenol such as the tannin compound. If the amount of the effective component contained in the thermoplastic resin is smaller than 2 ppm, it is difficult to impart sufficient flame retardancy to the thermoplastic resin. On the other hand, if the amount of the effective component contained in the thermoplastic resin exceeds 20,000 ppm, a large amount of the effective component of the polyhydric phenol such as the tannin compound is allowed to be present between the adjacent polymer molecules of the thermoplastic resin, with the result that the thermal characteristics and the mechanical strength of the thermoplastic resin tend to be degraded.

As described above, the agent of the present invention for imparting flame retardancy to a thermoplastic resin contains as an effective component a polyhydric phenol such as a tannin compound. Therefore, it is possible to improve the thermal stability of a thermoplastic resin by adding the flame retardancy imparting agent of the present invention to a thermoplastic resin such as a polyester resin, thereby suppressing or preventing the combustion of the thermoplastic resin.

To be more specific, if the polymer chain of the thermoplastic resin is cut by heat or a shearing stress, the cut portion forms a radical molecule. The present inventors disclosed previously in Japanese Patents Nos. 3046962, 3046963 and 3046964 that, since catechins trap the radicals generated in a thermoplastic resin, the thermoplastic resin is allowed to exhibit a high thermal stability.

It should be noted that, if a thermoplastic resin is combusted, the resin is decomposed so as to generate a gas. The gas thus generated reacts with oxygen contained in the air, with the result that the combustion is continued. The present inventors have arrived at the idea that, if the thermoplastic resin is excellent in the thermal stability in the combustion mechanism, the generation of the combustion gas is decreased. Based on this idea, the present inventors have found that it is possible to suppress or prevent the combustion of the thermoplastic resin by adding a polyhydric phenol such as a tannin compound to the thermoplastic resin as an excellent thermal stabilizer, leading to the completion in the development of the agent of the present invention for imparting flame retardancy to the thermoplastic resin. Incidentally, the effect produced by the flame retardancy imparting agent of the present invention does not rely on the combustion mechanism described above.

It should also be noted that excellent flame retardancy can be imparted to the thermoplastic resin without impairing the basic properties of the thermoplastic resin by adding traces, e.g., 2 to 20,000 ppm, of the flame retardancy imparting agent of the present invention to various thermoplastic resins. Further, the thermoplastic resin to which is added the flame retardancy imparting agent of the present invention does not contain a halogen element or phosphorus. It follows that it is possible to avoid detrimental effects on the environment and the human body.

Where tannin copolymerized with PVA and/or PEG, which is selected from among the tannin compounds used as the agent of the present invention for imparting flame retardancy to the thermoplastic resin, is added to a thermoplastic resin, the copolymer tannin is prevented from being decomposed by the heat generated when the thermoplastic resin is molded, with the result that the thermal stability can be effectively imparted to the thermoplastic resin by tannin. Incidentally, tannin is released when the copolymer tannin is heated to about 280° C. This is convenient in allowing the copolymer tannin to perform the function of a thermal stabilizer of a thermoplastic resin.

The present invention will now be described in more detail with reference to Examples and Comparative Examples.

EXAMPLES 1 AND 2

China tannin was added to two lots of Kurapet KS 750RC (trade name of PET resin manufactured by Kurare Inc.) in an amount of 200 ppm and 2,000 ppm, respectively, so as to prepare resin compositions. Then, combustion test pieces were prepared by injection molding of these resin compositions under the conditions shown in Table 1 below. Incidentally, "Clockner F-85" shown in Table 1 is a trade name of a molding machine manufactured by Clockner Inc.

TABLE 1

| Molding machine | | Clockner F-85 |
|---|---|---|
| Shape of molded article | | 127 × 13 × 3.1 mm strip |
| Drying condition | | 130° C. × 5 hours or more |
| Cylinder temperature (° C.) | Nozzle | 290 |
| | Front portion | 280 |
| | Central portion | 275 |
| | Rear portion | 270 |
| Mold temperature (° C.) | | 30–40 |
| Injection pressure max100 | MPa | 56.4 |
| | rate (%) | 24 |
| Held pressure max100 | MPa | 84.7 |
| | rate (%) | 36 |
| Injection rate (%) max200 | | 20 |
| Screw | Rotating speed rpm | 80 |
| | Back pressure MPa | 0.2 |
| | Measurement (sec) | 7.9–10.9 |
| Cycle (sec) | Injection time | 5.0 |
| | Pressure holding time | 6.0 |
| | Cooling time | 16.0 |
| | cycle time | 36 |

EXAMPLE 3

An aqueous solution of polyvinyl alcohol was prepared by collecting 10 g of polyvinyl alcohol (reagent grade 1 manufactured by Nakaraitesk Inc. and having a weight average molecular weight of 400) in a beaker, followed by adding 100 mL of a pure water to the collected polyvinyl alcohol while stirring the aqueous system. Then, an aqueous solution of China tannin was prepared by dissolving 200 g of China tannin equal to that used in Example 1 in 100 mL of a pure water, followed by pouring simultaneously the aqueous solution of polyvinyl alcohol and the aqueous solution of China tannin noted above into a beaker having an inner volume of 500 mL while stirring the mixture of these two kinds of aqueous solutions with a glass rod so as to form a brown floating substance. The resultant solution was left to stand at room temperature for 24 hours, followed by separating the precipitate from the liquid layer by the decantation method and subsequently washing the separated precipitate with a pure water several times. The washed precipitate was dried at 60° C. for 24 hours so as to obtain a brown PVA/tannin copolymer (cA). The weight of the copolymer was found to be 27.5 g, and the yield was about 92%.

The PVA/tannin copolymer (cA) thus obtained was added in an amount of 200 ppm to a PET resin similar to that used in Example 1, and a combustion test piece was prepared by the injection molding of the resultant resin composition under the conditions shown in Table 1.

EXAMPLE 4

A PEG/tannin copolymer (gA) was obtained as in Example 3, except that polyethylene glycol (reagent grade 1 manufactured by Nakaraitesk Inc. and having a weight average molecular weight of 6,000) was used in place of polyvinyl alcohol. The yield of the copolymer was about 94%.

Then, 200 ppm of the PEG/tannin copolymer (gA) thus obtained was added to a PET resin equal to that used in Example 1, and a combustion test piece was prepared by injection molding of the resultant resin composition under the conditions shown in Table 1.

EXAMPLE 5

200 ppm of catechin (reagent grade 1 manufactured by Nakaraitesk Inc.) was added to a PET resin equal to that used in Example 1, and a combustion test piece was prepared by the injection molding of the resultant resin composition under the conditions shown in Table 1.

COMPARATIVE EXAMPLE 1

A combustion test piece was prepared by the injection molding of a PET resin equal to that used in Example 1 under the conditions shown in Table 1. Tannin was not added to the PET resin.

A combustion test was applied to the combustion test piece prepared in each of Examples 1 to 5 and Comparative Example 1 under the conditions specified in UL-94HB. To be more specific, in the combustion test, the flame of a burner was kept applied to the edge portion of each of the combustion test pieces for 10 seconds, and the combustion length of the test piece was measured 10 seconds later. Table 2 shows the results of the test.

Concerning the combustion test, Table 2 includes a column "Between edge and gage mark of 25 mm". It is indicated in this column of Table 2 that, for example, the combustion length for Example 1 was 5 mm. This indicates that the combustion test piece was combusted by the length of 5 mm when the flame of the burner was kept applied to the edge portion of the test piece for 10 seconds. Also, the combustion time of 0 second indicated in this column of Table 2 denotes that the combustion of the test piece was stopped immediately after the flame ceased to be applied to the test piece.

Table 2 also indicates the combustion time and the combustion length of the test piece in the region of "Between gage mark of 25 mm and gage mark of 100 mm". The mark "-" for each of Examples 1 to 5 in the column of "Between gage mark of 25 mm and gage mark of 100 mm" denotes that the particular region of the combustion test piece was not combusted.

Incidentally, the combustion test was conducted by third-party organization DJK Research Center K.K. at the request of the inventors.

was found to be superior to 5 the combustion test piece for Comparative Example 1 in the effect of suppressing the combustion.

EXAMPLE 6

Resin compositions were prepared by adding varied amounts of China tannin to a PET resin equal to that used in Example 1, and combustion test pieces were prepared by the injection molding of the resin compositions thus prepared under the conditions shown in Table 1. A combustion test was applied to each of these combustion test pieces under the conditions specified in UL-94HB as in Example 1. In the combustion test, the combustion test piece was combusted in the vertical direction so as to measure the combustion time during which the combustion test piece continued to be combusted. Figure is a graph showing the relationship between the addition amount of China tannin and the combustion time.

As apparent from FIGURE, the combustion time of the combustion test piece to which was added China tannin as a flame retardancy imparting agent was shorter than that of the combustion test piece to which China tannin was not added, supporting that China tannin performs the function of a flame-retardant. Particularly, where China tannin was added in an amount not smaller than 2 ppm, the combustion time of the combustion test piece was prominently shortened, supporting a prominent function of China tannin as a flame-retardant.

EXAMPLE 7

A resin composition was prepared by adding 10,000 ppm of China tannin equal to that used in Example 1 to each of "Junerax 2000" (trade name of PBT resin manufactured by Polyplastic Inc.), "Panlite L1250" (trade name of PC resin manufactured by Teijin Kasei K.K.), "Ubeloy CX104" (trade name of PC/ABS alloy manufactured by Ube Cyclon Inc.), and "Nobaloy B, B1500" (trade name of PBT/ABS alloy manufactured by Dicel Chemical Industries Inc.). The addition amount of China tannin corresponds to 1.0% by weight based on the resin. Then, a combustion test piece was prepared by the injection molding of each of the resin compositions thus prepared under the conditions shown in Table 1.

COMPARATIVE EXAMPLE 2

A combustion test piece was prepared by the injection molding of each of the various thermoplastic resins equal to

TABLE 2

|  | Thickness of test piece (mm) | Between edge and gage mark of 25 mm | | Between gage mark of 25 mm and gage mark of 100 mm | | |
|---|---|---|---|---|---|---|
|  |  | Combustion time (s) | Combustion length (mm) | Combustion time (s) | Combustion length (mm) | Combustion rate (mm/min) |
| Example 1 | 3.28 | 0 | 5 | — | — | — |
| Example 2 | 3.26 | 0 | 7 | — | — | — |
| Example 3 | 3.25 | 0 | 0 | — | — | — |
| Example 4 | 3.24 | 0 | 4 | — | — | — |
| Example 5 | 3.25 | 0 | 2 | — | — | — |
| Comparative Example 1 | 3.25 | 54 | 25 | 255 | 58 | 13.6 |

As apparent from Table 2, the combustion test piece for each of Examples 1 to 5, in which a tannin compound was added to the test piece as a flame retardancy imparting agent, those used in Example 7 under the conditions shown in Table 1. Tannin was not added to any of these thermoplastic resins.

A combustion test was applied to the combustion test piece prepared in each of Example 7 and Comparative Example 2 as in Examples 1 to 5. Table 3 shows the results of the test.

In Table 3, the mark "-" for Example 7 in the column of "Between gage mark of 25 mm and gage mark of 100 mm" denotes that the particular region of the combustion test piece was not combusted.

Incidentally, the combustion test was conducted under the conditions specified in UL-94HB as in Example 1 by third-party organization DJK Research Center K. K. at the request of the inventors.

TABLE 3

| | Lot number | Thickness of test piece (mm) | Between edge and gage mark of 25 mm | | Between gage mark of 25 mm and gage mark of 100 mm | | |
|---|---|---|---|---|---|---|---|
| | | | Combustion time (s) | Combustion length (mm) | Combustion time (s) | Combustion length (mm) | Combustion rate (mm/min) |
| Example 7 | PBT | 3.18 | 1 | 2 | — | — | — |
| | PC | 3.25 | 0 | 0 | — | — | — |
| | PC/ABS | 3.20 | 5 | 3 | — | — | — |
| | PBT/ABS | 3.19 | 2 | 3 | — | — | — |
| Comparative | PBT | 3.18 | 42 | 25 | 155 | 98 | 38.0 |
| Example 2 | PC | 3.24 | 48 | 25 | 181 | 82 | 27.24 |
| | PC/ABS | 3.21 | 39 | 25 | 144 | 88 | 36.7 |
| | PBT/ABS | 3.18 | 52 | 25 | 152 | 100 | 39.5 |

As apparent from Table 3, the combustion test piece for Example 7, in which China tannin was added to the test piece, was found to be superior to the combustion test piece for Comparative Example 2 in the effect of suppressing combustion regardless of the kind of thermoplastic resin.

As described above in detail, the present invention provides an agent for imparting flame retardancy to a thermoplastic resin, said agent being capable of improving the thermal stability of the thermoplastic resin so as to elevate the decomposition temperature of the thermoplastic resin and, thus, capable of suppressing the combustibility of the thermoplastic resin.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An agent for imparting flame retardancy to a thermoplastic resin, said agent consisting of tannin copolymerized with polyethylene glycol.

2. An agent for imparting flame retardancy to a thermoplastic resin according to claim 1, wherein said tannin copolymerized with polyethylene glycol has a weight average molecular weight falling within a range of 800 to 900,000.

3. An agent for imparting flame retardancy to a thermoplastic resin according to claim 1, wherein said tannin copolymerized with polyethylene glycol is added to a thermoplastic resin in an amount falling within a range of 2 ppm to 20,000 ppm.

4. An agent for imparting flame retardancy to a thermoplastic resin according to claim 1, wherein said thermoplastic resin is a polyester resin selected from polyethylene terephthalate, polybutylene terephthalate and polycarbonate or a resin containing said polyester resin.

* * * * *